United States Patent
Honda

(10) Patent No.: US 7,890,000 B2
(45) Date of Patent: Feb. 15, 2011

(54) OPTICAL RECEIVING APPARATUS

(75) Inventor: Toshiki Honda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 593 days.

(21) Appl. No.: 11/889,659

(22) Filed: Aug. 15, 2007

(65) Prior Publication Data

US 2008/0069571 A1   Mar. 20, 2008

(30) Foreign Application Priority Data

Sep. 15, 2006 (JP) .............................. 2006-250409

(51) Int. Cl.
  *H04B 10/06* (2006.01)
(52) U.S. Cl. .................................. 398/202
(58) Field of Classification Search .......... 398/202–214
  See application file for complete search history.

(56) References Cited

U.S. PATENT DOCUMENTS

| 5,717,510 | A | 2/1998 | Ishikawa et al. |
|---|---|---|---|
| 5,754,322 | A | 5/1998 | Ishikawa et al. |
| 5,760,937 | A | 6/1998 | Ishikawa et al. |
| 5,815,294 | A | 9/1998 | Ishikawa et al. |
| 5,870,213 | A | 2/1999 | Ishikawa et al. |
| 5,896,217 | A | 4/1999 | Ishikawa et al. |
| 5,909,297 | A | 6/1999 | Ishikawa et al. |
| 5,991,477 | A | 11/1999 | Ishikawa et al. |
| 6,871,024 | B2 | 3/2005 | Nishimoto et al. |
| 7,076,169 | B2 * | 7/2006 | Shpantzer et al. ............. 398/76 |
| 2003/0007216 | A1 | 1/2003 | Chraplyvy et al. |
| 2003/0016695 | A1 | 1/2003 | Sabet et al. |
| 2004/0081470 | A1 | 4/2004 | Griffin |
| 2008/0279562 | A1* | 11/2008 | Naoe et al. .................. 398/140 |

FOREIGN PATENT DOCUMENTS

| JP | 8-321805 | 12/1996 |
|---|---|---|
| JP | 2000-115077 | 4/2000 |
| JP | 2002-208892 | 7/2002 |
| JP | 2003-60580 | 2/2003 |
| JP | 2003-179667 | 6/2003 |
| JP | 2004-516743 | 6/2004 |

* cited by examiner

*Primary Examiner*—Leslie Pascal
(74) *Attorney, Agent, or Firm*—Fujitsu Patent Center

(57) ABSTRACT

An optical receiving apparatus is provided with a receiver, a setting unit, and a storage unit. The receiver receives an optical signal modulated in a DPSK format and performs variable dispersion compensation and delay interference processing on the optical signal to demodulate the optical signal. The setting unit sets suitable setting values of the variable dispersion compensation and the delay interference processing for the receiver based on an error condition of the demodulated signal. The storage unit stores the setting values set by the setting unit.

9 Claims, 10 Drawing Sheets

| WAVELENGTH (CH) | DISPERSION COMPENSATION AMOUNT | PHASE SHIFT AMOUNT |
|---|---|---|
| CH1 | 3.82 | 5.23 |
| CH2 | ⋮ | ⋮ |
| ⋮ | ⋮ | ⋮ |
| CHm | 3.82 | 5.23 |

| WAVE-LENGTH (CH) | MORNING | | DAYTIME | | NIGHTTIME | |
|---|---|---|---|---|---|---|
| | DISPERSION COMPENSATION AMOUNT | PHASE SHIFT AMOUNT | DISPERSION COMPENSATION AMOUNT | PHASE SHIFT AMOUNT | DISPERSION COMPENSATION AMOUNT | PHASE SHIFT AMOUNT |
| CH1 | 3.82 | 4.73 | 4.75 | 4.85 | 2.91 | 3.51 |
| CH2 | ⋮ | ⋮ | ⋮ | ⋮ | ⋮ | ⋮ |
| ⋮ | | | | | | |
| CHm | | | | | | |

FIG.13
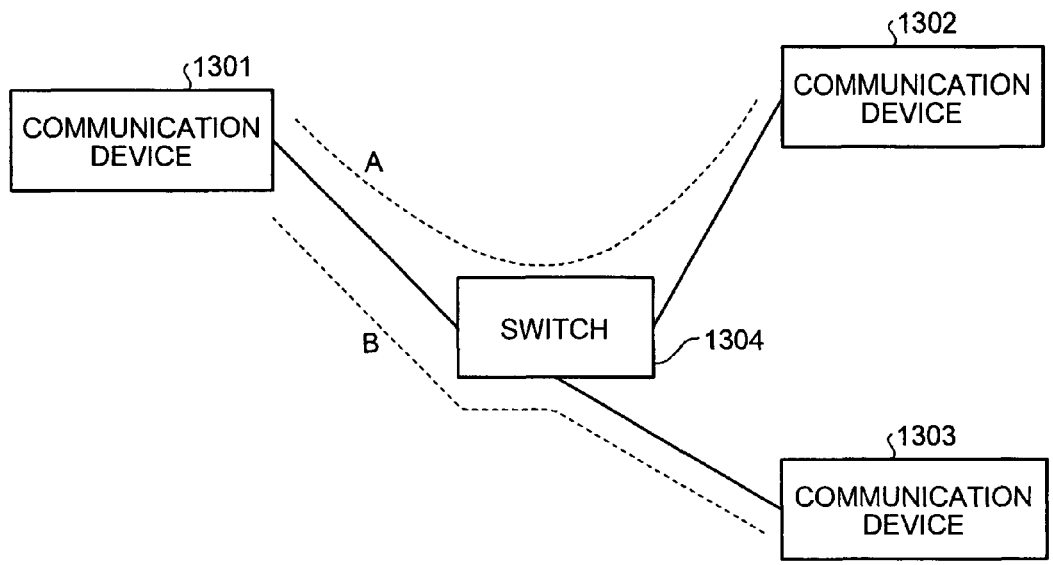
FIG.14
| WAVE-LENGTH (CH) | COMMUNICATION PATH A 1401 | | COMMUNICATION PATH B 1402 | |
|---|---|---|---|---|
| | DISPERSION COMPENSATION AMOUNT | PHASE SHIFT AMOUNT | DISPERSION COMPENSATION AMOUNT | PHASE SHIFT AMOUNT |
| CH1 | 3.82 | 4.52 | 4.75 | 5.23 |
| CH2 | ⋮ | ⋮ | ⋮ | ⋮ |
| ⋮ | | | | |
| CHm | | | | |
FIG.15
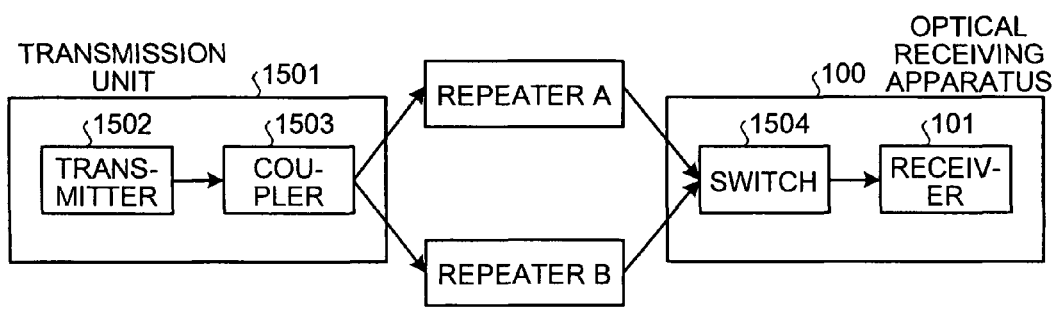

OPTICAL RECEIVING APPARATUS

CROSS-REFERENCE TO RELATED APPLICATIONS

This application is based upon and claims the benefit of priority from the prior Japanese Patent Application No. 2006-250409, filed on Sep. 15, 2006, the entire contents of which are incorporated herein by reference.

BACKGROUND OF THE INVENTION

1. Field of the Invention

The present invention relates to an optical receiving apparatus that receives an optical signal modulated in a differential phase shift keying (DPSK) modulation format.

2. Description of the Related Art

In recent years, the demand for introducing a next-generation 40 Gb/s optical transmission system has been increasing that also achieves transmission distance and spectrum efficiency equivalent to a 10 Gb/s system. As a method for implementing the system, research and development have become active on the return-to-zero DPSK (RZ-DPSK) modulation format or the carrier suppressed RZ-DPSK (CSRZ-DPSK) modulation format that is superior in terms of an optical signal noise ratio (OSNR) tolerance and nonlinearity tolerance compared to the non return-to-zero (NRZ) modulation method conventionally applied in a system of 10 Gb/s or less.

In addition to the modulation formats mentioned above, research and development have become active also on phase modulation formats with a narrow spectrum (high frequency), such as the RZ differential quadrature phase shift keying (RZ-DQPSK) modulation format or the CSRZ-DQPSK modulation format. As for the optical receiving apparatus that demodulates the optical signal modulated with the DPSK modulation format, the optical receiving apparatus using a delay interferometer has been studied (for example, Japanese Patent Application Laid-open Publication No. 2004-516743).

However, if 40 Gb/s or 43 Gb/s transmission is performed by the optical receiving apparatus that utilizes the modulation formats mentioned above, wavelength dispersion tolerance would be reduced to approximately 1/16 of that of 10 Gb/s transmission. For this reason, it is necessary to arrange a variable chromatic dispersion compensator (VDC) at a receiving end of the optical receiving apparatus to perform dispersion compensation with high precision.

In this case, the optical receiving apparatus requires not only to control a setting value of a phase shift amount for the delay interferometer, but also to control the setting value of a dispersion compensation amount for the variable chromatic dispersion compensator. In other words, upon receiving the optical signal modulated with the (CS) RZ-D(Q)PSK modulation format, it is required to optimally set both the delay interferometer and the variable chromatic dispersion compensator for demodulating the received optical signal.

As for dispersion compensation, it is possible to monitor an error condition using the number of error corrections for the decoded received signal and control the variable chromatic dispersion compensator in accordance with the monitored error condition. However, the dispersion compensation amount in the variable chromatic dispersion compensator and the phase shift amount in the delay interferometer have different properties for the number of errors from each other. For this reason, it is required to search for the optimal values for both the dispersion compensation amount and the phase shift amount, or a combination thereof, to improve the quality of the received signal, leading to a problem that it takes time until the control of the variable chromatic dispersion compensator and the delay interferometer is stabilized.

FIG. 17 is a graph of the dispersion compensation amount and a phase shift, associated with a power penalty. The dispersion compensation amount represents the dispersion compensation amount in the variable chromatic dispersion compensator. The phase shift represents the phase shift in the delay interferometer. The power penalty represents an amount of increase in received optical power required to obtain a desired bit error rate (BER), and the power penalty decreases as the BER decreases. As shown in FIG. 17, the dispersion compensation amount where the power penalty is the minimum (i.e., the BER is the minimum) varies depending on the phase shift.

FIG. 18 depicts process of searching and setting the dispersion compensation amount and the phase shift amount. Since the dispersion compensation amount where the BER is the minimum varies depending on the phase shift as described above, it is required to change the dispersion compensation amount and the phase shift amount alternatively while monitoring the BER, as shown in FIG. 18, to search for the combination of the dispersion compensation amount and the phase shift amount where the BER is the minimum. Therefore, it takes time (for example, approximately 10 minutes) until the dispersion compensation amount and the phase shift amount are optimally set to stabilize the optical receiving apparatus when the optical receiving apparatus is started up, protected, or a communication path thereof is switched.

In addition, since wavelength dispersion in a transmission line or an optical phase difference in the delay interferometer varies depending on a temperature change or the like during operation of the optical transmission system, it is required to set the dispersion compensation amount and the phase shift amount so as to follow the variation. However, it takes time to search for the optimal dispersion compensation amount and the optimal phase shift amount, as described above. Therefore, the setting that follows the variation cannot be achieved if these amounts are searched whenever a wavelength dispersion amount in the transmission line or the optical phase difference varies.

SUMMARY OF THE INVENTION

It is an object of the present invention to at least solve the above problems in the conventional technologies.

An optical receiving apparatus according to one aspect of the present invention includes a receiver that receives an optical signal modulated by a differential phase shift keying and that performs variable dispersion compensation and delay interference processing on the optical signal to demodulate the optical signal; a setting unit that sets setting values at appropriate values for the variable dispersion compensation and the delay interference processing based on an error condition of the demodulated optical signal; and a storage unit that stores the setting values set by the setting unit.

An optical receiving method according to another aspect of the present invention is of performing variable dispersion compensation and delay interference processing on an optical signal modulated by a differential phase shift keying, to demodulate the optical signal. The optical receiving method includes setting values at appropriate values for the variable dispersion compensation and the delay interference processing based on an error condition of the demodulated optical signal; and storing the values set at the setting.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 13 is a schematic illustrating a storage example of a setting value for an optical receiving apparatus according to a seventh embodiment of the present invention;

FIG. 14 illustrates an example of a table stored in a storage unit of the optical receiving apparatus according to the seventh embodiment;

FIG. 15 is a schematic illustrating a storage example of a setting value for an optical receiving apparatus according to an eighth embodiment of the present invention;

DETAILED DESCRIPTION OF THE PREFERRED EMBODIMENTS

Exemplary embodiments of the present invention will be explained in detail below with reference to the accompanying drawings.

Figure 1:
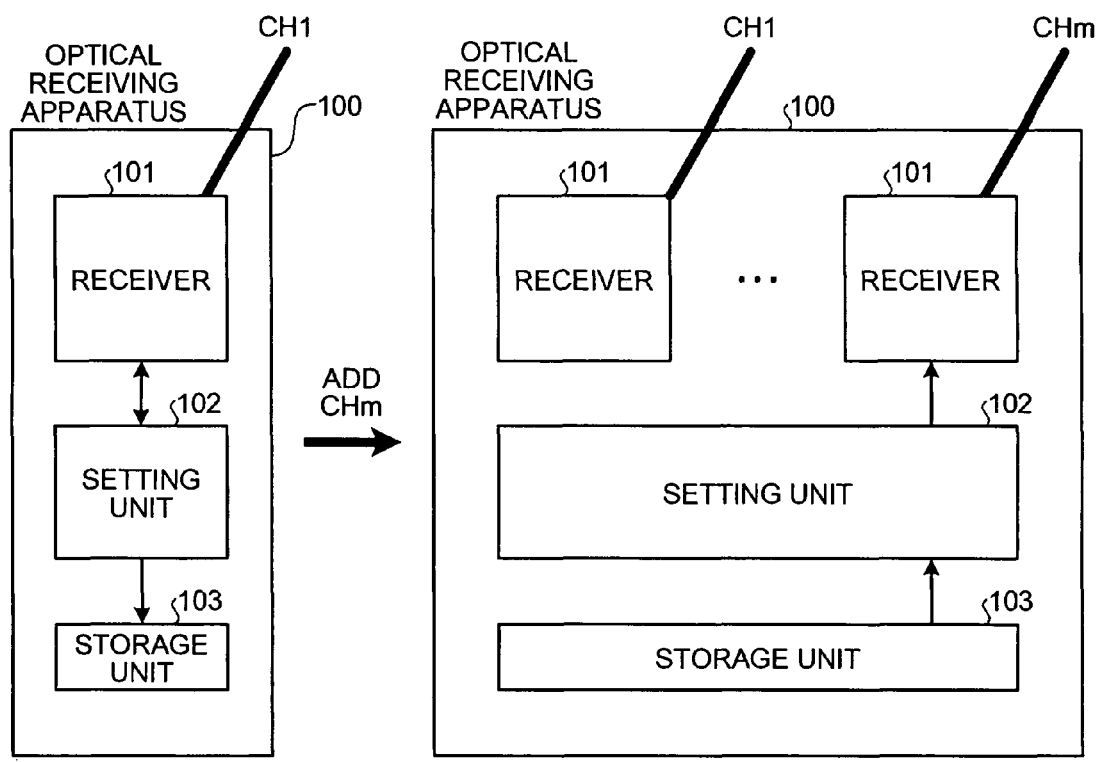
FIG. 1 is a block diagram of an optical receiving apparatus according to a first embodiment of the present invention.

FIG. 1 is a block diagram of an optical receiving apparatus according to a first embodiment of the present invention. The optical receiving apparatus according to the first embodiment receives an optical signal multiplexed in the DPSK format to demultiplex the signal, and demodulates each of the demultiplexed optical signals. As shown in FIG. 1, an optical receiving apparatus 100 is provided with a receiver 101, a setting unit 102, and a storage unit 103. The optical receiving apparatus 100 may also be provided with a plurality of receivers 101.

Here, the case where a multiplex system of the optical signal is wavelength division multiplexing (WDM) transmission system will be described. To the optical receiving apparatus 100, the receivers 101 for receiving the optical signals of different wavelengths can be added if needed as additional channels (CH1 to CHm, where m is positive integer other than 1).

The receiver 101 receives the optical signal modulated with the DPSK format, performs variable dispersion compensation and delay interference for the received optical signal to demodulate the optical signal. The receiver 101 outputs an error condition of the demodulated signal to the setting unit 102. The receiver 101 changes setting values of variable dispersion compensation and delay interference for the optical signal in accordance with control by the setting unit 102.

The setting unit 102 searches the setting value for the receiver 101 and sets the suitable setting value, based on the error condition of the demodulated signal output from the receiver 101. In addition, when the setting value is stored in the storage unit 103, the setting unit 102 sets the setting value for the receiver 101 using the stored setting value.

For example, when the receiver 101 CHm is added as shown in FIG. 1, the setting unit 102 sets the setting value for the receiver 101 CHm using the setting value stored for the receiver 101 CH1. Various examples where the setting unit 102 uses the stored setting value will be described later. Although the case where the setting unit 102 sets the setting values for the receivers 101 in the optical receiving apparatus 100 is described, the setting unit 102 may be provided for each receiver 101.

The storage unit 103 stores the setting value that set by the setting unit 102.

Figure 2:
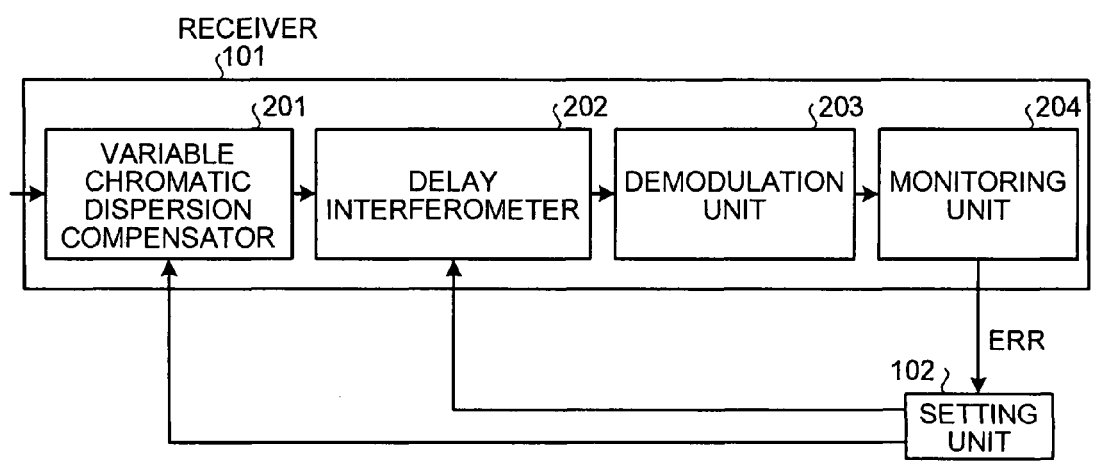
FIG. 2 is a block diagram of a receiver and a setting unit of the optical receiving apparatus according to the first embodiment.

FIG. 2 is a block diagram of the receiver and the setting unit of the optical receiving apparatus according to the first embodiment. The receiver 101 of the optical receiving apparatus 100 according to the first embodiment is provided with a variable chromatic dispersion compensator (VDC) 201, a delay interferometer 202, a demodulation unit 203, and a monitoring unit 204.

The variable chromatic dispersion compensator 201 receives the optical signal sent from a non-illustrated transmission unit, and performs dispersion compensation with a variable dispersion compensation amount for the received optical signal. The variable chromatic dispersion compensator 201 changes the amount of dispersion compensation for the optical signal in accordance with control by the setting unit 102. The variable chromatic dispersion compensator 201 outputs the optical signal to which dispersion compensation is performed to the delay interferometer 202.

The delay interferometer 202 performs delay interference processing for the optical signal output from the variable chromatic dispersion compensator 201. Specifically, the delay interferometer 202 divides the optical signal into two, delays one of divided components by 1 bit while phase-controlling the other divided component by a variable phase shift amount, and causes the two divided components to interfere with each other. The delay interferometer 202 outputs an interference result to the demodulation unit 203.

The demodulation unit 203 demodulates the interference result output from the delay interferometer 202 by photoelectrically convert the interference result into a demodulated electrical signal. The demodulation unit 203 can be realized by a photoelectric conversion element, such as a pin photo diode (PD). The demodulation unit 203 outputs the demodulated electrical signal to the monitoring unit 204.

The monitoring unit 204 monitors the error condition of the demodulated electrical signal output from the demodulation unit 203. For example, the monitoring unit 204 calculates a BER, as the error condition, based on such as the number of error corrections of the demodulated electrical signal. The monitoring unit 204 outputs monitored error condition information (ERR) to the setting unit 102.

The setting unit 102 searches for the suitable dispersion compensation amount for the variable chromatic dispersion compensator 201 and the suitable phase shift amount for the delay interferometer 202, based on the error condition information output from the monitoring unit 204, and sets these amounts as the setting values for the receiver 101. For example, the setting unit 102 searches for the dispersion compensation amount and the phase shift amount where the error condition is suitable and sets these values by changing the dispersion compensation amount in the variable chromatic dispersion compensator 201 and the phase shift amount in the delay interferometer 202 alternatively while monitoring the error condition information. The dispersion compensation amount and the phase shift amount where the error condition is suitable are those where the BER is the minimum, for example.

Figures 3, 4:
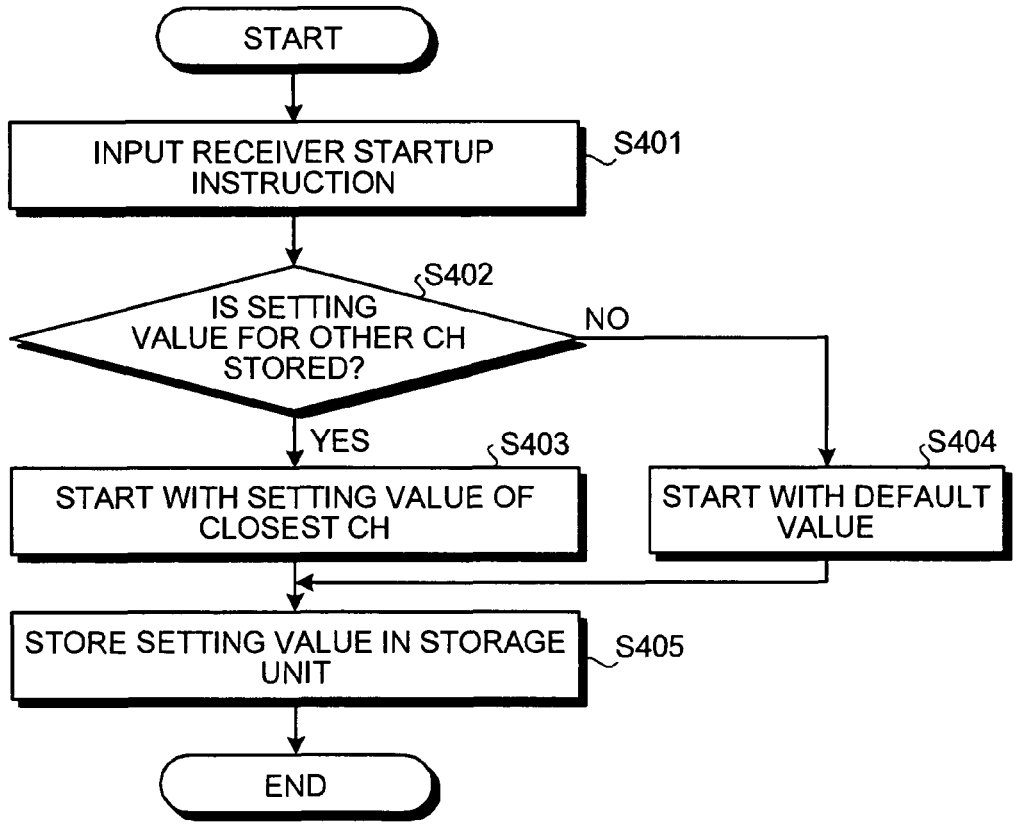
FIG. 3 illustrates a table stored in a storage unit of the optical receiving apparatus according to the first embodiment.
FIG. 4 is a flowchart of an operation of the optical receiving apparatus according to the first embodiment.

FIG. 3 illustrates a table stored in the storage unit of the optical receiving apparatus according to the first embodiment. As shown in FIG. 3, the storage unit 103 of the optical receiving apparatus 100 according to the first embodiment stores a dispersion compensation amount 301 in the variable chromatic dispersion compensator 201 and a phase shift amount 302 in the delay interferometer 202 while associating them with each CH.

Numeric values in the table represent the setting values for setting the dispersion compensation amount and the phase shift amount. Although the numeric values in the table represent voltages (V) applied to the variable chromatic dispersion compensator 201 and the delay interferometer 202, the form of the dispersion compensation amount and the phase shift amount stored in the storage unit 103 is not limited thereto. For example, the setting value of the dispersion compensation amount 301 may be the amount of dispersion compensation (ps/nm/km) to be actually performed. In addition, the setting value of the phase shift amount 302 may be the amount of phase shift (nm) to be actually adjusted. These are similarly applicable to tables described later.

FIG. 4 is a flowchart of an operation of the optical receiving apparatus according to the first embodiment. As shown in FIG. 4, a receiver startup instruction is input first for the receiver 101 for which the setting value has not been set (step S401). Next, the storage unit 103 is searched to determine whether the setting value for other CH or CHs is stored (step S402). If the setting value for other CH or CHs is stored (step S402: YES), the receiver 101 is started with the setting value, among the stored setting values, corresponding to the CH of which the wavelength is closest to that of the CH of the receiver 101 to be started (step S403).

At step S402, if the setting value for other CH or CHs is not stored (step S402: NO), the receiver 101 is started with a default (for example, 0) (step S404). Next, the setting value set at step S403 or step S404 is stored in the storage unit 103 (step S405), and a series of processing is finished.

Although it is determined whether the setting value for other CH or CHs is stored in the storage unit 103 at step S402, it is not limited to the setting value for other CH or CHs but it may be determined whether the setting value is stored, which has been previously set for the receiver 101 for which the setting values of the dispersion compensation amount and the phase shift amount are not set.

Incidentally, the optical receiving apparatus 100 according to the first embodiment is suitable for narrow-band optical transmission using an L band (0.5 GHz to 1.5 GHz) or a C band (4 GHz to 8 GHz). For example, assume that a wavelength range of 1540.72 nm to 1604.07 nm is divided for each 50 GHz and CH1 to CHm are assigned to the respective divided ranges sequentially from a short-wavelength side.

Figure 5:
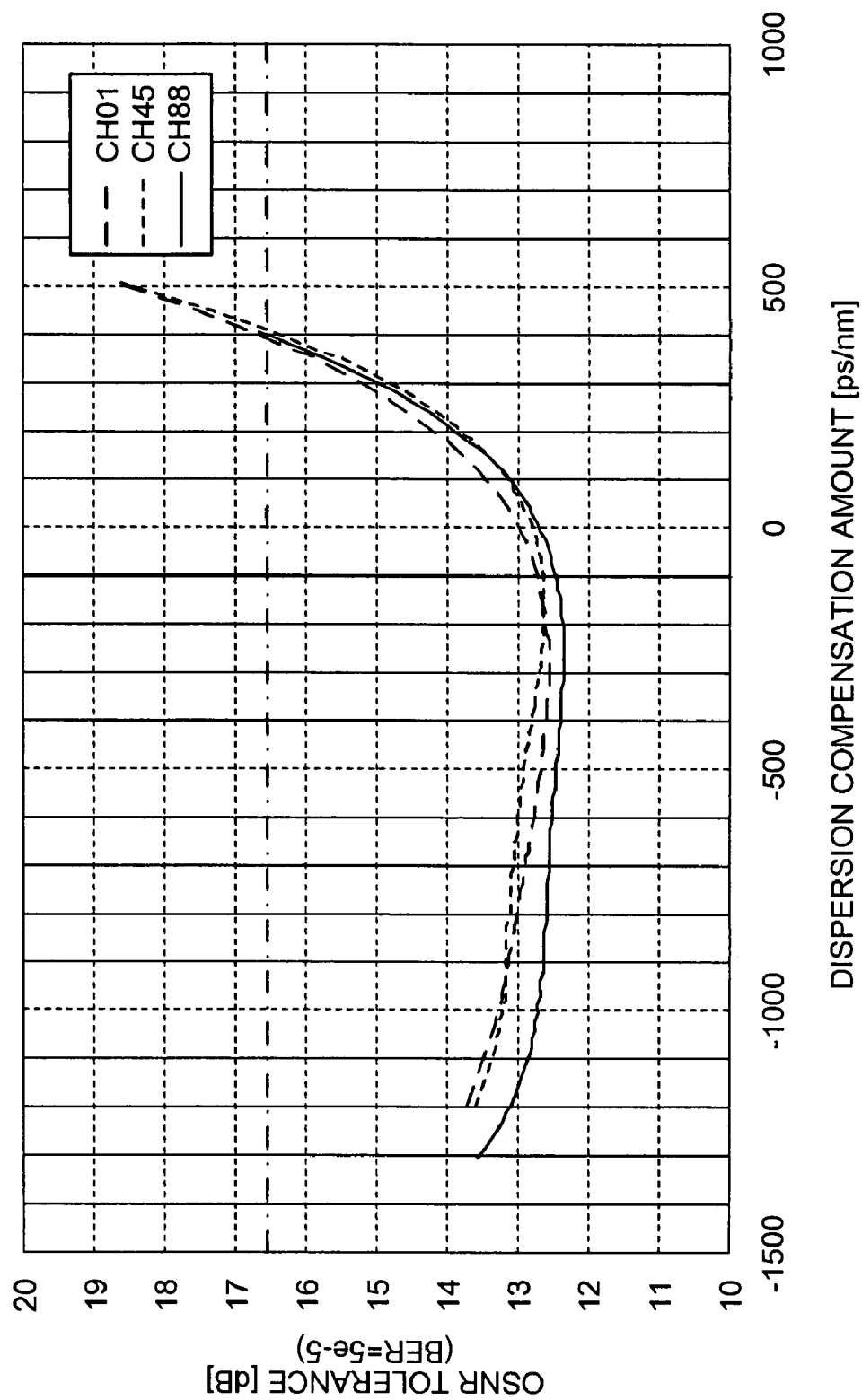
FIG. 5 is a graph illustrating a relation between a dispersion compensation amount and OSNR tolerance in an L band.

FIG. 5 is a graph illustrating a relation between the dispersion compensation amount and OSNR tolerance in the L band for each CH. In FIG. 5, CH01, CH88, and CH45 are the CHs with the shortest wavelength, the longest wavelength, and a wavelength therebetween within the L band. The OSNR tolerance is an OSNR required for obtaining the desired BER (here, 5$e$-5). The OSNR tolerance decreases as the BER decreases.

As shown in FIG. 5, it can be seen that the difference among OSNR tolerance properties in the L band for the respective CHs is not significant. In addition, the optimal setting value of the dispersion compensation amount for each CH where the OSNR tolerance is the lowest is not substantially different from each other. Using these characteristics, when a new CH is added within the same narrow band (such as the L band or the C band), the optical receiving apparatus 100 sets the setting value stored in the storage unit 103 as an initial value for the new CH.

In this manner, the optical receiving apparatus 100 can shorten the time until the initial values of the dispersion compensation amount and the phase shift amount are set. Although the difference among the OSNR tolerance properties in the narrow band for the respective CHs is not significant, the dispersion compensation amount and the phase shift amount that are more suitable can be obtained using the setting value for the CH of which the wavelength is the closest to that of the new CH when adding the new CH.

As described above, in the optical receiving apparatus 100 according to the first embodiment, the setup setting value for the existing receiver 101 can be utilized when the new receiver 101 is added in an optical transmission system using the narrow band. Thus, the time required for setting the suitable setting value for the new receiver 101 can be shortened.

The optical receiving apparatus according to a second embodiment of the present invention performs optical transmission using a wide band including the L band (0.5 GHz to 1.5 GHz), an S band (2 GHz to 4 GHz), and the C band (4 GHz to 8 GHz). In this case, the difference between the wavelengths for the respective CHs may increase, and the optimal dispersion compensation amount and the optimal phase shift amount may differ significantly for each CH.

Figure 6:
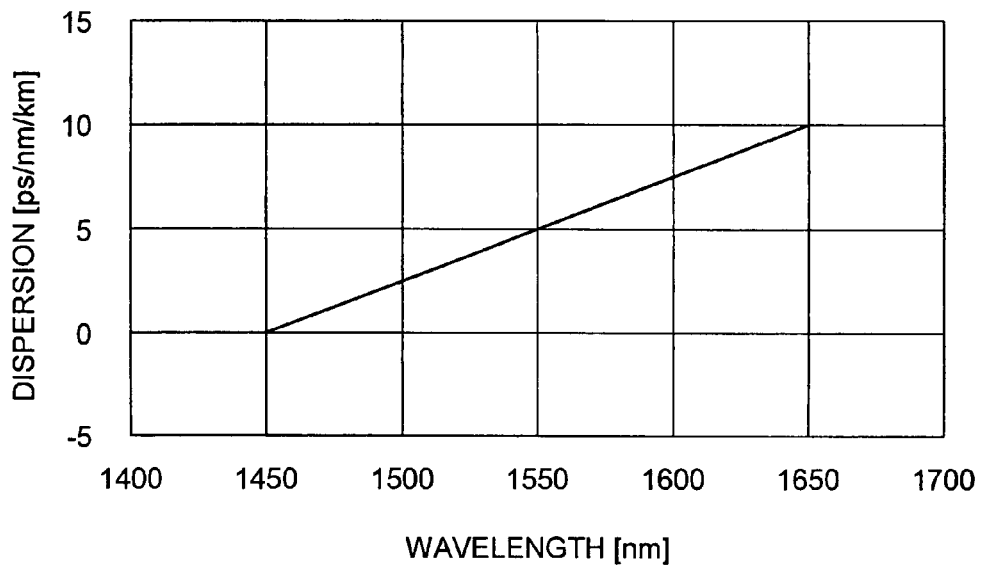
FIG. 6 is a graph illustrating a relation between a wavelength and dispersion in an optical fiber.

FIG. 6 is a graph illustrating a relation between the wavelength and the dispersion in an optical fiber. Since the wavelength and the dispersion in the optical fiber is proportional to each other as shown in FIG. 6, the setting value of the suitable dispersion compensation amount for the added receiver 101 can be assumed from the setting value of the dispersion compensation amount for other CH or CHs in the same transmission line.

For example, where Y is the suitable dispersion compensation amount for the added receiver 101, $\lambda_1$ is the wavelength of the added receiver, X is the suitable dispersion compensation amount for the existing receiver 101 with the wavelength closest to that for the added receiver 101, $\lambda_2$ is the wavelength of the existing receiver 101, and $\delta$ is the amount of change in an wavelength dispersion amount per unit wavelength, the suitable dispersion compensation amount Y for the added receiver 101 may be assumed to satisfy $Y=X+(\lambda 1-\lambda 2)\times\delta$.

Specifically, in the example shown in FIG. 6, if the wavelength of the CH of the added receiver 101 is greater by 100 nm than the wavelength of the other CH, the wavelength dispersion generated in the CH of the added receiver 101 would be greater than that of the other CH by 5 ps/nm/km. Consequently, it can be assumed that the optimal setting value of the dispersion compensation amount for the added receiver 101 may be obtained by correcting the setting value to be greater by 5 ps/nm/km than the setting value of the dispersion compensation amount for the other CH.

Figure 7:
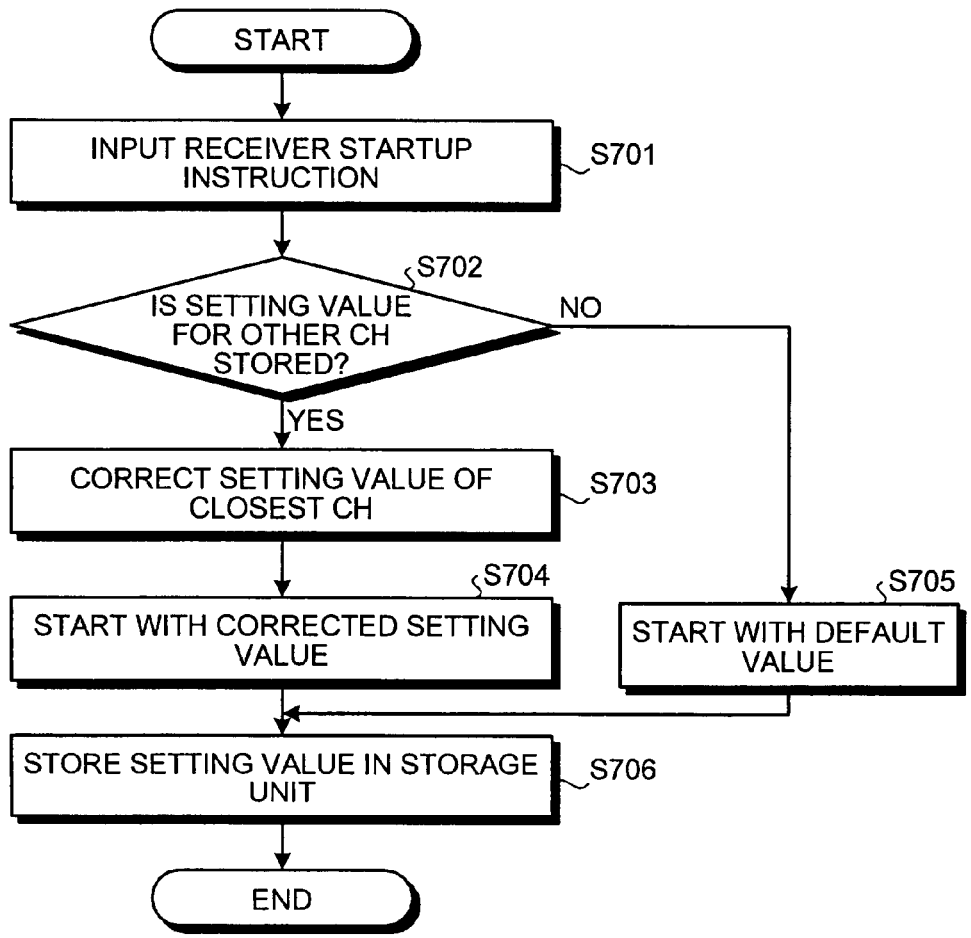
FIG. 7 is a flowchart of an operation of an optical receiving apparatus according to a second embodiment of the present invention.

FIG. 7 is a flowchart of an operation of the optical receiving apparatus according to the second embodiment. As shown in FIG. 7, the startup instruction is input first for the receiver 101 for which the setting value has not been set (step S701). Next, the storage unit 103 is searched to determine whether the setting value for other CH or CHs is stored (step S702). If the setting value for other CH or CHs is stored (step S702: YES), the setting value, among the stored setting values, for the CH of which the wavelength is closest to that of the CH of the receiver 101 is corrected (step S703, see FIG. 6).

Next, the receiver 101 is started with the setting value corrected at step S703 (step S704). At step S702, if the setting value for other CH or CHs is not stored (step S702: NO), the receiver 101 is started with the default (for example, 0) (step S705). Next, the setting value set at step S704 or step S705 is stored in the storage unit 103 (step S706), and a series of processing is finished.

Although it is determined whether the setting value for other CH or CHs is stored in the storage unit 103 at step S702, as described above, it is not limited to the setting value for other CH or CHs but it may be determined whether the setting value is stored, which has been previously set for the receiver 101 for which the setting values of the dispersion compensation amount and the phase shift amount are not set.

As described above, in the optical receiving apparatus 100 according to the second embodiment, the setup setting value for the existing receiver 101 can be utilized when the new receiver 101 is added in the optical transmission system using the wide band, while the suitable setting value for the new receiver 101 can be assumed from the wavelengths of the new receiver 101 and the existing receiver 101. Thus, the time until the suitable setting value for the new receiver 101 is set can be shortened.

Figure 8:
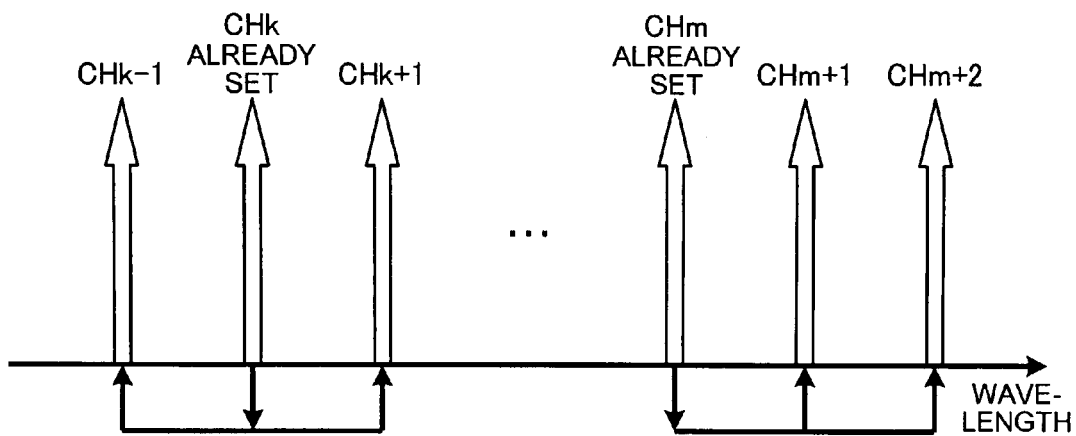
FIG. 8 is a schematic illustrating a setting example of a setting value when adding a receiver of an optical receiving apparatus according to a third embodiment the present invention.

FIG. 8 is a schematic illustrating a setting example of the setting value when adding the receiver of the optical receiving apparatus according to the third embodiment. In FIG. 8, an abscissa represents the wavelength. CHk-1, CHk, CHk+1, . . . , CHm, CHm+1, and CHm+2 represent the CHs with the different wavelengths, respectively.

Suppose that the setting value for CHk has been already set suitably and this setting value is stored in the storage unit 103. If CHk-1 and CHk+1, i.e., the CHs that respectively adjoin CHk on the left and right sides, are added, the setting value for CHk stored in the storage unit 103 is set as the initial value of the setting values for CHk-1 and CHk+1.

In addition, suppose that the setting value for CHm has been set suitably and this setting value is stored in the storage unit 103. If CHm+1 that adjoins CHm on the right side and CHm+2 that adjoins CHm+1 on the right side are added, the setting value for CHm is set as the initial value of the setting values for CHm+1 and CHm+2.

Figure 9:
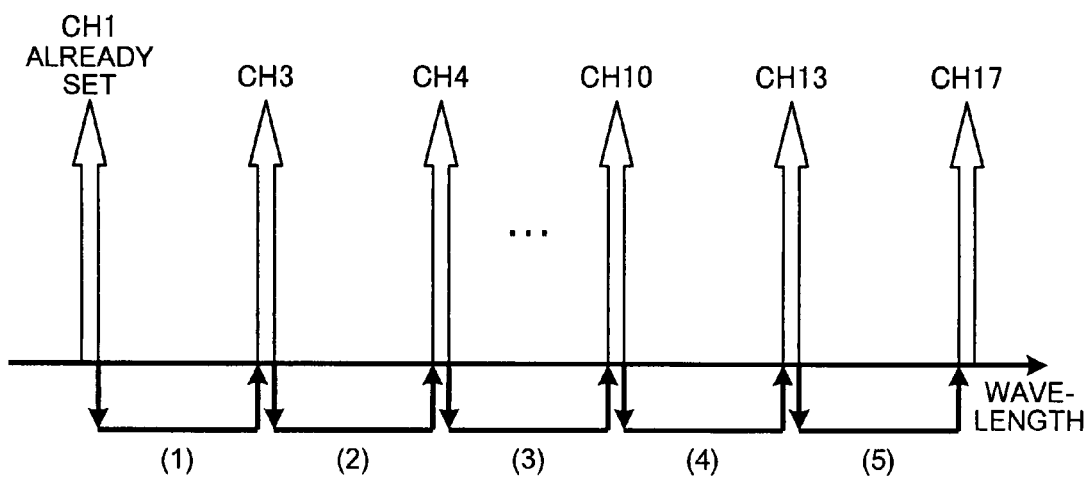
FIG. 9 is a schematic illustrating a setting example of the setting value when adding the receiver of the optical receiving apparatus according to the third embodiment.

FIG. 9 is a schematic illustrating a setting example the setting value when adding the receiver of the optical receiving apparatus according to the third embodiment. In FIG. 9, an abscissa represents the wavelength. CH1, CH3, CH4, . . . , CH10, CH13, and CH17 represent the CHs with the different wavelengths, respectively. Suppose that the setting value for CH1 has been already set suitably and this setting value is stored in the storage unit 103. If CH3, CH4, . . . , CH10, CH13, and CH17 are added sequentially, the setting value for each CH is set sequentially, i.e., the setting value for CH1 is set as the initial value of the setting value for CH3 (1), the setting value for CH3 is set as the initial value of the setting value for CH 4 (2), and so forth.

As described above, in the optical receiving apparatus 100 according to the third embodiment, the setup setting value for the existing receiver 101 can be utilized when a plurality of new receivers 101 are added sequentially. Thus, the time required for setting the suitable setting values for the new receivers 101 can be shortened.

Figure 10:
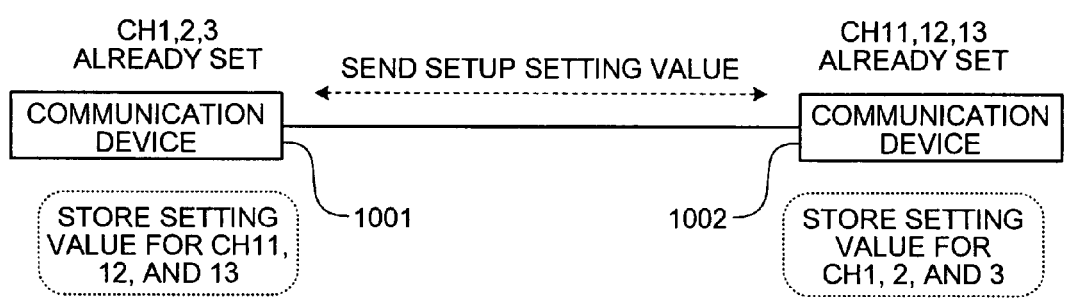
FIG. 10 is a schematic illustrating a storage example of the setting value for an optical receiving apparatus according to a fourth embodiment of the present invention.

FIG. 10 is a schematic illustrating a storage example of the setting value for the optical receiving apparatus according to a fourth embodiment of the present invention. The optical receiving apparatus 100 according to the fourth embodiment shares the suitable setting value for each CH with a communication device of a connection destination. In the example shown in FIG. 10, communication devices 1001 and 1002 are the communication devices equipped with the functions of the optical receiving apparatus 100 according to the fourth embodiment.

Suppose that there are CH1 to CH13 in the transmission line between the communication devices 1001 and 1002. In addition, assume that the setting values for CH1, CH2, and CH3 of the communication device 1001 have been already set suitably while the setting values for CH11, CH12, and CH13 of the communication device 1002 have been already set suitably. Moreover, assume that these suitable setting values are stored in the storage units 103 of the respective communication devices.

The communication devices 1001 and 1002 respectively send the setup setting values to the other communication device. The communication devices 1001 and 1002 then stores the received setting values in the respective storage units 103. For example, when the communication device 1001 sets the suitably setting value for CH1, this setting value is sent to the communication device 1002. The communication device 1002 can set the setting value for CH1 efficiently by storing the setting value for CH1 sent from the communication device 1001.

The timing to send the setting value to the other communication device may be immediately after the setting value is set or after a request signal from the other communication device is received. In addition, to receive the setting value from the other communication device, an optical service channel (OSC) of the optical transmission system can be used.

As described above, according to the optical receiving apparatus 100 according to the fourth embodiment, the suitable setting value for each CH can be shared with the communication device of the connection destination. Thus, when the setting value for the receiver of the communication device of the connection destination has been set suitably, the time required for setting the suitable setting value for the receiver 101 can be shortened.

Figures 11, 12:
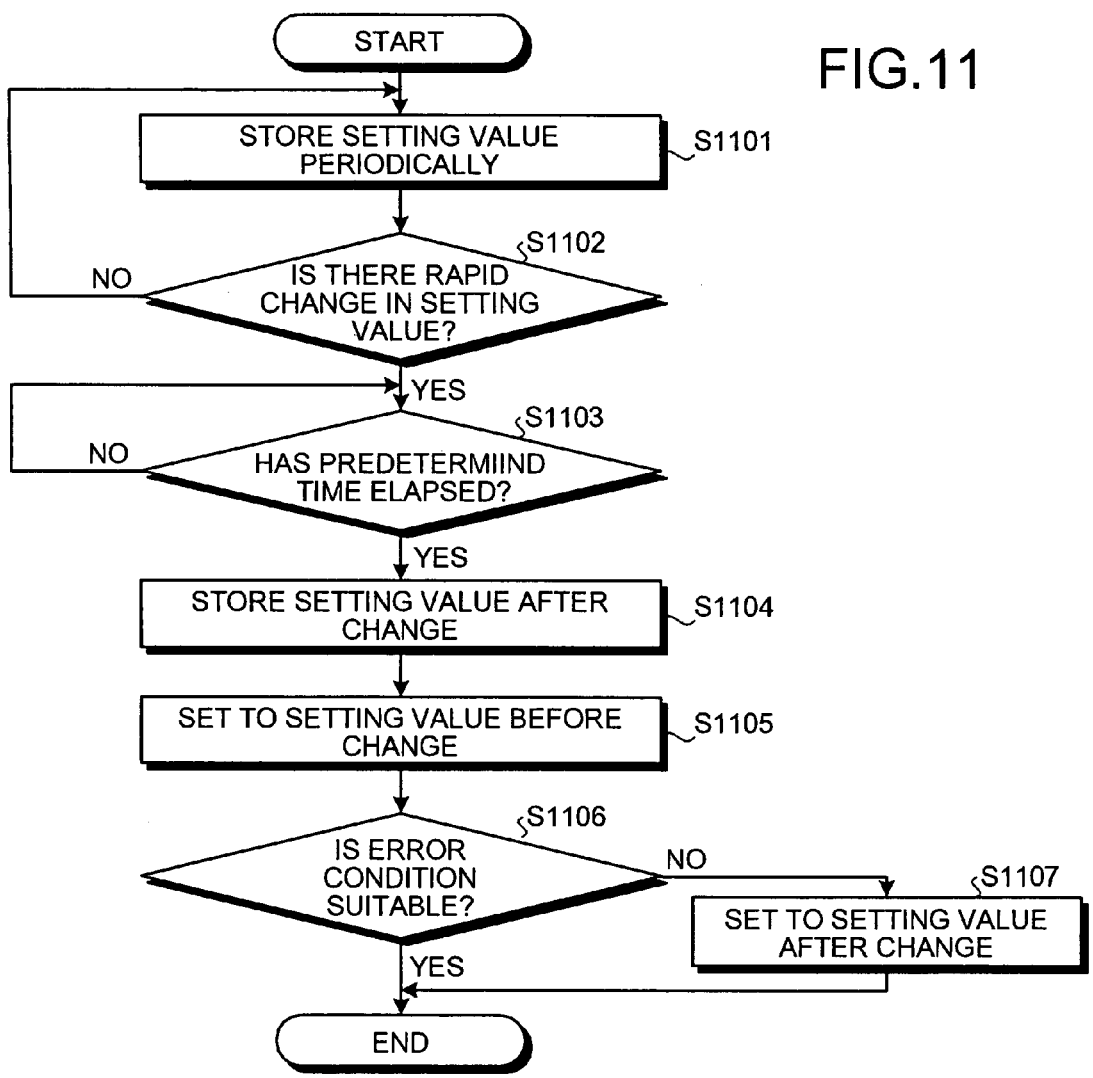
FIG. 11 is a flowchart of an operation of an optical receiving apparatus according to a fifth embodiment of the present invention.
FIG. 12 illustrates an example of a table stored in a storage unit of an optical receiving apparatus according to a sixth embodiment of the present invention.

FIG. 11 is a flowchart of an operation of the optical receiving apparatus according to a fifth embodiment. When fiber kink (bending) occurs by such as an operator touching the optical fiber, the suitable setting value is changed significantly. If the bending is restored thereafter, the suitable setting value is also restored. The optical receiving apparatus 100 according to the fifth embodiment sets the setting value to the original value in a short time after such a temporary change in the setting value occurs.

As shown in FIG. 11, firstly, the setup setting value is stored periodically (step S1101). Next, it is determined whether there is a rapid change in the setting value (step S1102). For example, it is determined whether the setting value is changed at a rate greater than a predetermined rate of change. If there is no rapid change in the setting value (step S1102: NO), the procedure returns to step S1101 and processing is continued.

At Step 1102, if there is a rapid change in the setting value (step S1102: YES), it is waited until a predetermined time elapses (S1103: NO) and, when the given time period elapses (step S1103: YES), the setting value after the change is stored (step S1104). Next, the setting value for the receiver 101 is set to the setting value periodically stored before the setting value is changed (step S1105). For example, by setting the setting value for the receiver 101 to the latest setting value among the setting values that have been periodically stored, the setting value can be restored efficiently to the value immediately before being changed.

Next, it is determined whether the error condition is suitable (step S1106). If the error condition is suitable (step S1106: YES), it can be determined that the change in the setting value has been temporary, so that a series of processing is finished while maintaining the setting value for the receiver 101 before the change. If the error condition is not suitable (step S1106: NO), it can be determined that the change in the setting value has not been temporary, so that the setting value for the receiver 101 is set to the setting value after the change, which has been stored at step S1104 (step S1107), and a series of processing is then finished.

Although it is determined whether there is the rapid change in the setting value at step S1102, it may be determined whether there is the rapid change in the error condition instead of the setting value. In this case, it may be determined whether the BER is changed at a rate greater than the predetermined rate of change.

As described above, in the optical receiving apparatus 100 according to the fifth embodiment, the setup setting value is stored periodically and, when there is the rapid change of the setting value by such as bending of the optical fiber, the stored setting value before the change can be set for the receiver 101 after a certain time period. Thus, when there is the temporary change in the setting value, the time required for setting the original setting value for the receiver 101 can be shortened.

FIG. 12 illustrates an example of a table stored in the storage unit of the optical receiving apparatus according to a sixth embodiment of the present invention. The suitable setting value for the receiver 101 may vary depending on the time period even for the same CH. For example, the suitable setting value of the dispersion compensation amount of the variable chromatic dispersion compensator 201 in the daytime, when the temperature of the optical fiber increases, differs from those in the morning or in the nighttime. The storage unit 103 according to the sixth embodiment stores the setting value for the receiver 101 for every given time period.

FIG. 12 is an example of a table in the storage unit including the respective setting values for the receiver stored in the morning, the daytime, and the nighttime. As shown in FIG. 12, the storage unit 103 stores setting values 1201 in the morning, setting values 1202 in the daytime, and setting values 1203 in the nighttime of the suitable dispersion compensation amount and the suitable phase shift amount, separately.

The setting unit 102 sets the setting value of the receiver 101 based on the setting value corresponding to the current time period among the setting values stored in the storage unit 103. For example, if the receiver 101 downs in the morning and restarts in the daytime due to restoration taking time, the setting value for the receiver 101 is set to the setting values 1202 corresponding to the daytime.

Although the case where the setting values are stored respectively for the morning is described, the daytime, and the nighttime, division of time is not limited thereto. For example, the setting value may be stored for each season, each date, or each hour. In addition, the setting value may be stored for each condition, such as temperature, instead of the time period. In this case, the setting unit 102 selects the setting value that corresponds to the condition at present to set the setting value for the receiver 101.

As described above, in the optical receiving apparatus 100 according to the sixth embodiment, the suitable setting value is stored for each condition, such as the time period, and the setting unit 102 can select the setting value that corresponds to the condition at present to set the setting value for the receiver 101. Thus, when the suitable setting value varies depending on the condition, the time required for setting the suitable setting value for the receiver 101 can be shortened.

FIG. 13 is an example of storing the setting value for the optical receiving apparatus according to a seventh embodiment of the present invention. The optical receiving apparatus 100 according to the seventh embodiment stores the setting value corresponding to each communication path of the receiver 101 and, when the communication path of the receiver 101 is switched, sets the setting value for the receiver 101 based on the setting value corresponding to the communication path after switching. In the example shown in FIG. 13, communication devices 1301, 1302, and 1303 are the communication devices equipped with the functions of the optical receiving apparatus 100 according to the seventh embodiment. The communication devices 1301, 1302, and 1303 are connected with each other via a switch 1304.

For example, the communication device 1301 has the setting value corresponding to a communication path A with the communication device 1302 and the setting value corresponding to a communication path B with the communication device 1303 stored in the storage unit 103. When the communication device 1301 is in communication with the communication device 1302 and then communicates with the communication device 1303, a path switching instruction is sent to the switch 1304 while selecting the setting value corresponding to the communication path B with the communication device 1303 from the storage unit 103 to set the setting value for the receiver 101 with the selected setting value. To send the path switching instruction to the switch 1304, the OSC of the optical transmission system can be used.

FIG. 14 illustrates an example of a table stored in the storage unit of the optical receiving apparatus according to the seventh embodiment. Suppose that the table as shown in FIG. 14 is stored in the communication device 1301 (see FIG. 13). As shown in FIG. 14, the storage unit 103 of the optical receiving apparatus according to the seventh embodiment stores a dispersion compensation amount 1401 in the variable chromatic dispersion compensator 201 and a phase shift amount 1402 in the delay interferometer 202 for the respective communication paths A and B while associating them with each CH.

As described above, in the optical receiving apparatus 100 according to the seventh embodiment, the setting value corresponding to each communication path of the receiver 101 is stored and, when the communication path of the receiver 101 is switched, the setting value can be set for the receiver 101 based on the setting value corresponding to the communication path after switching. Thus, when the communication path of the receiver 101 is switched, the time required for setting the suitable setting value for the receiver 101 can be shortened.

FIG. 15 is a schematic illustrating a storage example of the setting value for the optical receiving apparatus according to an eighth embodiment of the present invention. As shown in FIG. 15, the optical signal sent from a transmitter 1502 of a transmission unit 1501 is divided by a coupler 1503 and the respective divided components are sent to the optical receiving apparatus 100 via repeaters A and B. In the optical receiving apparatus 100, the optical signal received via the repeater A, or the optical signal received via the repeater B is output to the receiver 101 via a switch 1504.

Although the configuration of such an optical transmission system is redundant due to the transmission unit 1501 and the optical receiving apparatus 100 being connected through a plurality of communication paths, the communication can be continued even when a failure occurs in one communication path, by switching to the other communication path (protection). However, the suitable setting value for the receiver 101 may vary for the respective communication paths and, in such a case, it takes time to set suitably the setting value for the receiver 101 upon switching the communication path.

The optical receiving apparatus 100 according to the eighth embodiment stores the table of the suitable setting values for the receiver 101 for each of the communication paths via the repeaters A and B while associating them with each CH. Since this table is similar to the table shown in FIG. 14, description thereof is omitted here.

As described above, in the optical receiving apparatus 100 according to the eighth embodiment, when the redundant communication paths are established to prepare for the failure in the communication path, the setting values for the respective communication paths can be stored. Thereby, when the failure occurs in the communication path and the protection is carried out, the time required for setting the suitable setting value for the receiver 101 can be shortened.

EXAMPLE

Figure 16:
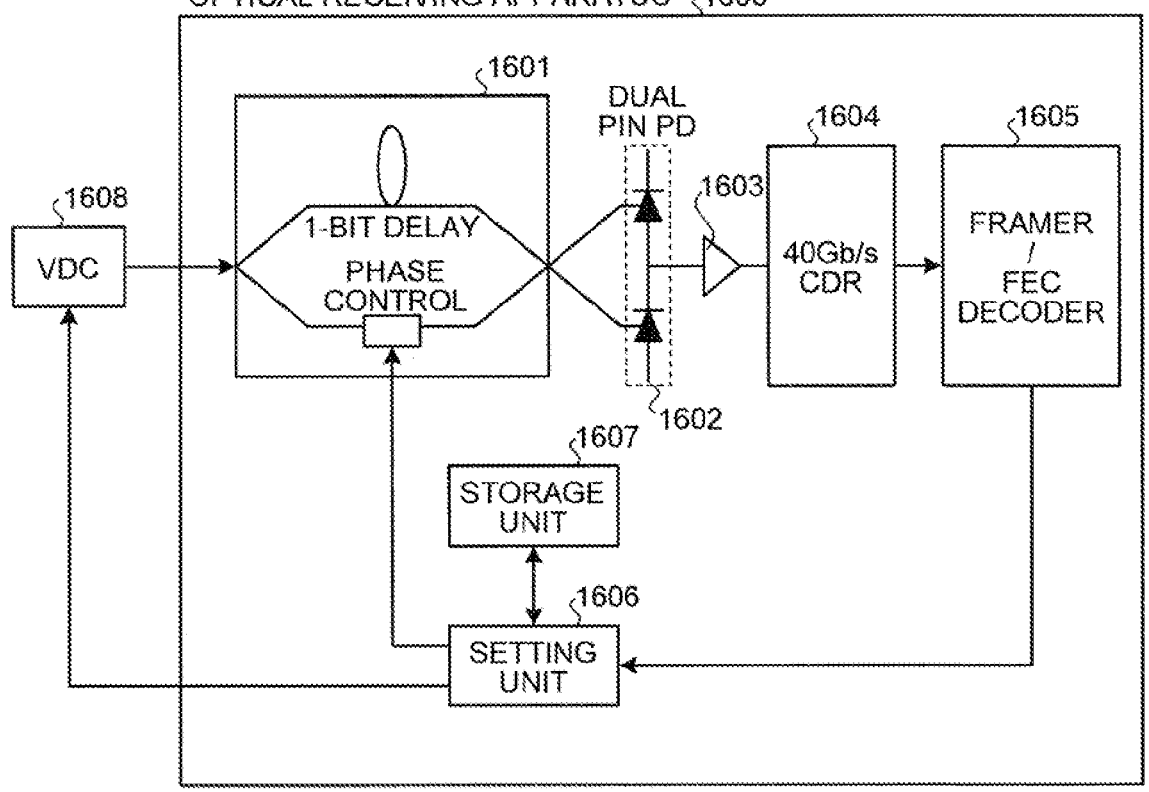
FIG. 16 is a block diagram of an optical receiving apparatus according to embodiments of the present invention that is applied to an optical receiving apparatus utilizing (CS)RZ-DPSK modulation format.
Figure 17:
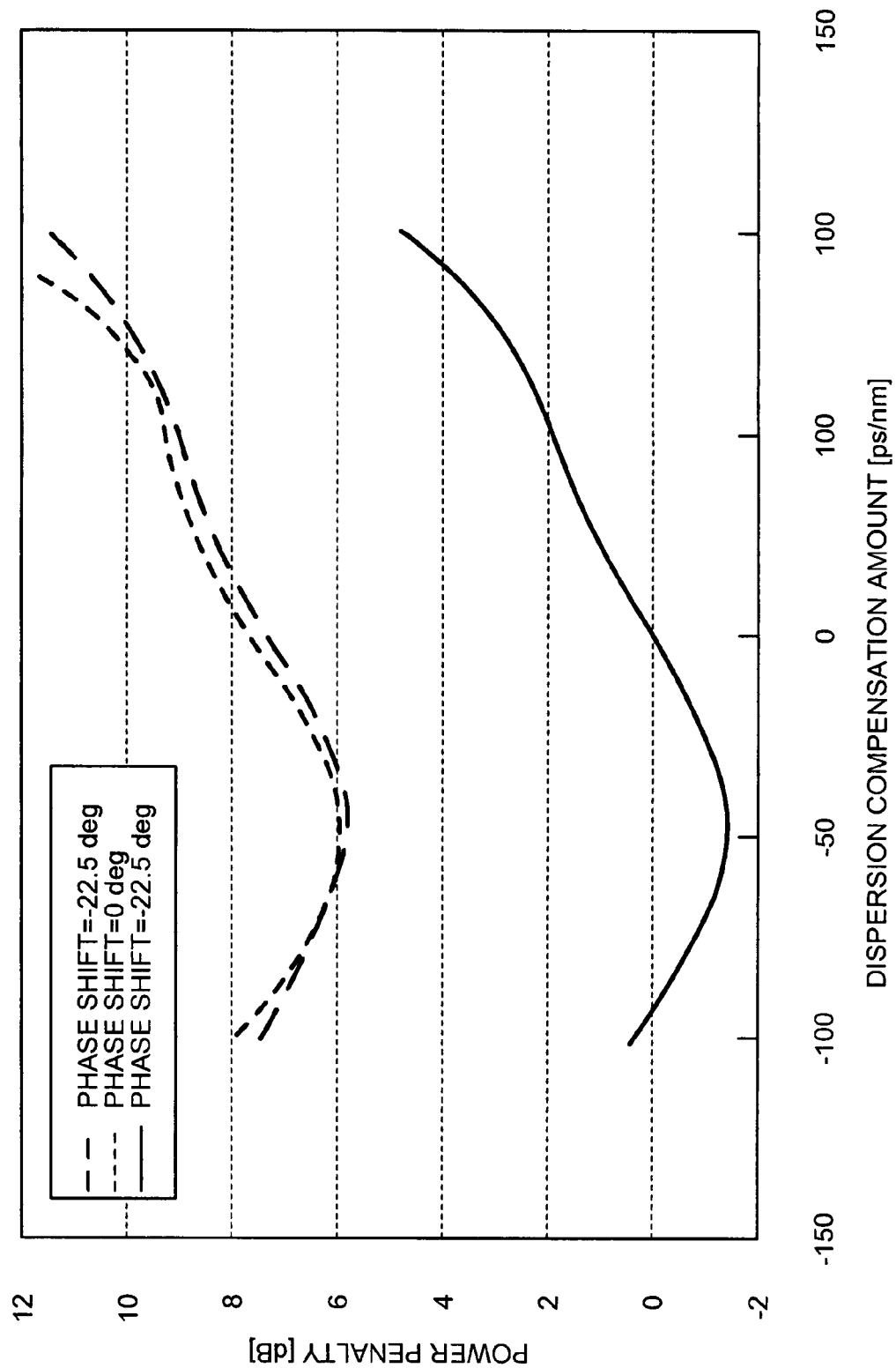
FIG. 17 is a graph of a dispersion compensation amount and a phase shift, associated with a power penalty.
Figure 18:
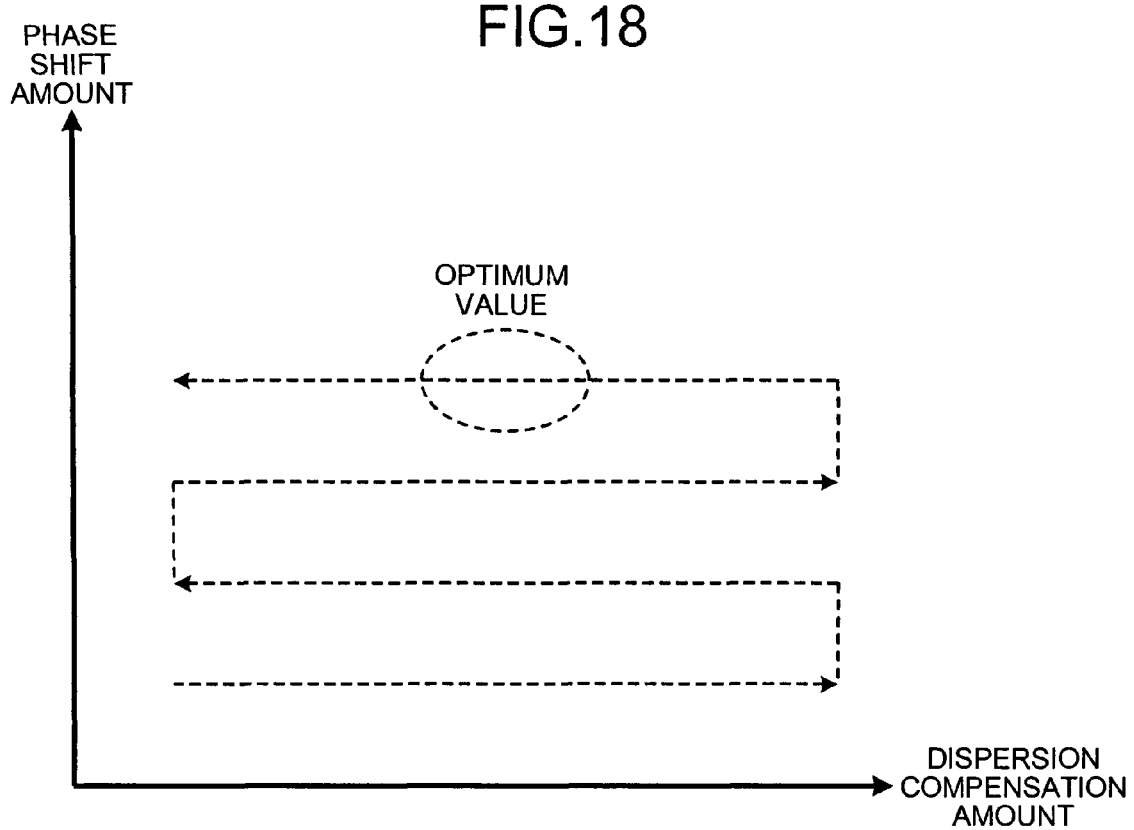
FIG. 18 illustrates process of setting the dispersion compensation amount and a phase shift amount.

FIG. 16 is a block diagram of the optical receiving apparatus according to the embodiments that is applied to the optical receiving apparatus with the (CS)RZ-DPSK modulation format. As shown in FIG. 16, an optical receiving apparatus 1600 according to an example is provided with a delay interferometer 1601, a photoelectric conversion section 1602, an amplifier 1603, a reflex circuit 1604, a received data processing section 1605, a setting unit 1606, and a storage unit 1607. In addition, a variable chromatic dispersion compensator (VDC) 1608 is provided at the receiving end of the optical receiving apparatus 1600. The variable chromatic dispersion compensator 1608 may be provided in the interior of the optical receiving apparatus 1600.

The delay interferometer 1601 performs delay interference of a (CS)RZ-DPSK signal (here, 43 Gb/s) received via the transmission line. The delay interferometer 1601 can be configured by a Mach-Zehnder interferometer, for example. Specifically, the delay interferometer 1601 divides the (CS)RZ-DPSK signal into two by the coupler and forms one branch waveguide to be longer than the other branch waveguide.

In addition, the delay interferometer 1601 is provided with an electrode to phase-control the optical signal to be propagated to the other branch waveguide. The delay interferometer 1601 causes a delay component that is delayed by 1-bit time (here, 23.3 ps) from the (CS)RZ-DPSK signal and the component that is phase-controlled at 0 radian for the (CS)RZ-DPSK signal to interfere with each other by the coupler. Although one of the two outputs from the delay interferometer 1601 is a positive interference and the other is a negative interference, which outputs serves as the positive interference depends on the phase difference of the two components.

The photoelectric conversion section 1602 receives the two outputs from the delay interferometer 1601 and performs differential photoelectric conversion detection (balanced detection) to detect the received signal based on which output of the two outputs serves as the positive interference. The photoelectric conversion section 1602 outputs the detected received signal to the reflex circuit 1604. The photoelectric conversion section 1602 is configured by a dual pin photodiode (dual pin PD).

The amplifier 1603 is provided between the photoelectric conversion section 1602 and the reflex circuit 1604, and suitably amplifies the received signal output from the photoelectric conversion section 1602 to the reflex circuit 1604.

The reflex circuit (CDR: clock and data recovery) 1604 extracts a data signal and a clock signal from the received signal output from the photoelectric conversion section 1602 via the amplifier 1603. The reflex circuit 1604 outputs the extracted data signal and clock signal to the received data processing section 1605.

The received data processing section 1605 has a framer function to perform frame processing for the input data signal, and a forward error correction (FEC) decoder function (FEC decoder) to perform error correction processing based on an error correction code assigned to a frame. The received data processing section 1605 performs signal processing, such as the error correction, based on the data signal and the clock signal output from the reflex circuit 1604. The received data processing section 1605 outputs the error condition information on the data signal to the setting unit 1606 based on a result of the error correction processing. The error condition information is such as the BER of the data signal, as described above.

The setting unit 1606 applies the voltage to the variable chromatic dispersion compensator 1608 and the electrode of the delay interferometer 1601, based on the error condition information output from the received data processing section 1605, and searches the dispersion compensation amount in the variable chromatic dispersion compensator 1608 and the phase shift amount in the delay interferometer 1601 for setting. Since the other functions of the setting unit 1606 and the storage unit 1607 are similar to those of the setting unit 102 and the storage unit 103 according to the respective embodiments described above, the detailed explanation thereof is omitted here.

The variable chromatic dispersion compensator 1608 performs dispersion compensation to the optical signal received from the transmission line in accordance with the voltage applied by the setting unit 1606. The variable chromatic dispersion compensator 1608 can be realized using such as a virtually imaged phased array (VIPA) board, for example.

As described above, according to the optical receiving apparatus of the present invention, the optical receiving apparatus provided with the variable chromatic dispersion compensator and the delay interferometer can store the setup suitable dispersion compensation amount and phase shift amount, and, when setting the dispersion compensation amount and the phase shift amount later, utilize the stored dispersion compensation amount and phase shift amount. Thus, the time required for setting the dispersion compensation amount and the phase shift amount for the receiver 101 can be shortened, and the dispersion compensation amount and the phase shift amount can be set so as to follow the variation of the wavelength dispersion in the transmission line or the optical phase difference in the delay interferometer even in the high-speed optical transmission.

According to the embodiments described above, the optical receiving apparatus provided with the variable chromatic dispersion compensator and the delay interferometer enables to shorten the time required for suitably setting the dispersion compensation amount and the phase shift amount, and to set the dispersion compensation amount and the phase shift amount so as to follow the variation of the wavelength dispersion in the transmission line or the optical phase difference in the delay interferometer even in high-speed optical transmission.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An optical receiving apparatus comprising:
   a receiver that receives an optical signal modulated by a differential phase shift keying and that performs variable dispersion compensation and delay interference processing on the optical signal to demodulate the optical signal;
   a setting unit that sets setting values at appropriate values for the variable dispersion compensation and the delay interference processing based on an error condition of the demodulated optical signal; and
   a storage unit that stores the setting values set by the setting unit, wherein
   the receiver is provided in plurality, and
   when a new receiver is additionally provided, the setting unit sets the setting values for the new receiver based on the setting values stored in the storage unit.

2. The optical receiving apparatus according to claim 1, wherein the receiver includes
   a receiving unit that receives the optical signal;
   a dispersion compensation unit that performs the dispersion compensation on the optical signal received by the receiving unit with a variable dispersion compensation amount;
   a delay interference unit that performs the delay interference processing to cause interference between a branch component that is obtained as a result of the dispersion compensation and that is delayed by one bit, and a branch component that is obtained as a result of a phase control on the optical signal with a variable phase shift amount;
   a demodulation unit that demodulates the optical signal that has been subjected to the delay interference processing, by photoelectrically converting into a demodulated electrical signal; and
   a monitoring unit that monitors an error condition of the demodulated electrical signal, wherein
   the appropriate values indicate an appropriate amount of the variable dispersion compensation and an appropriate amount of the variable phase shift amount.

3. The optical receiving apparatus according to claim 1, wherein
   the storage unit stores the setting values corresponding to each communication path of the receiver, and
   when the communication path of the receiver is switched to another communication path, the setting unit sets the setting values based on setting values corresponding to the other communication path among the setting values stored in the storage unit.

4. The optical receiving apparatus according to claim 1, wherein
   the receivers respectively receive the optical signals of different wavelengths, and
   the setting unit sets the setting values for the new receiver, based on setting values corresponding to a receiver having a wavelength closest to that of the new receiver, from among the setting values stored in the storage unit.

5. The optical receiving apparatus according to claim 1, wherein
   the receivers respectively receive the optical signals with the different wavelengths, and
   the setting unit sets the setting values for the new receiver, based on the setting values stored in the storage unit, a wavelength of the receiver corresponding to the setting values, and a wavelength of the new receiver.

6. The optical receiving apparatus according to claim 1, further comprising a setting-value receiving unit that receives setting values in a communication path from a communication device at a connection destination of the communication path corresponding to the receiver, wherein
   the storage unit stores the setting values received by the setting-value receiving unit, and
   when the receiver communicates with the communication device, the setting unit sets the setting values based on the setting values received by the setting-value receiving unit.

7. The optical receiving apparatus according to claim 1, wherein
   the storage unit stores the setting values periodically, and
   when a change is made in the setting values with a change rate greater than a predetermined rate, the setting unit sets the setting values of the receiver after a predetermined time elapses from time of the change based on the setting values stored in the storage unit before the change is made.

8. The optical receiving apparatus according to claim 1, wherein
   the storage unit stores the setting values for every predetermined time period, and
   the setting unit sets the setting values of the receiver based on setting values corresponding to a current time among the setting values stored in the storage unit.

9. An optical receiving method for an apparatus that includes a plurality of receivers each of which performs variable dispersion compensation and delay interference processing on an optical signal modulated by a differential phase shift keying to demodulate the optical signal, the optical receiving method comprising:
   setting values at appropriate values for the variable dispersion compensation and the delay interference processing based on an error condition of the demodulated optical signal; and
   storing the values set at the setting; and
   setting, when a new receiver is additionally provided, the values for the new receiver based on the values stored at the storing.

* * * * *